United States Patent [19]

Brandenstein et al.

[11] 4,449,841
[45] May 22, 1984

[54] FASTENING MEANS FOR AXIALLY SECURING MACHINE ELEMENTS AND METHOD THEREFOR

[75] Inventors: Manfred Brandenstein, Eussenheim; Rüdiger Hans, Niederwerrn, both of Fed. Rep. of Germany

[73] Assignee: SKF Kugellagerfabriken GmbH, Schweinfurt, Fed. Rep. of Germany

[21] Appl. No.: 406,908

[22] Filed: Aug. 10, 1982

[30] Foreign Application Priority Data

Aug. 17, 1981 [DE] Fed. Rep. of Germany ....... 3132443

[51] Int. Cl.³ .............................................. F16D 1/00
[52] U.S. Cl. ...................................... 403/24; 403/360; 403/375
[58] Field of Search ............... 403/326, 360, 375, 319, 403/355, 326, 24; 29/510, 517

[56] References Cited

U.S. PATENT DOCUMENTS

| | | | |
|---|---|---|---|
| 1,363,496 | 12/1920 | Crocker | 29/517 UX |
| 2,848,803 | 8/1958 | Schock | 29/517 |
| 3,560,124 | 2/1971 | Bergere | 29/510 X |
| 3,923,408 | 12/1975 | Belsdorf | 403/261 |

Primary Examiner—Andrew V. Kundrat
Attorney, Agent, or Firm—Eugene E. Renz, Jr.

[57] ABSTRACT

Means for securing a machine element such as a bearing assembly on a shaft member or the like provided with an annular groove comprising an angular ring (14) having a radially outwardly directed leg portion (15) which abuts against an axial end face of the inner ring component to be secured and an axial leg portion (16) which is pressed into the annular groove (17) of the shaft or the like at least at a plurality of circumferentially spaced locations about its periphery.

6 Claims, 2 Drawing Figures

FASTENING MEANS FOR AXIALLY SECURING MACHINE ELEMENTS AND METHOD THEREFOR

BACKGROUND AND SUMMARY OF THE INVENTION

The present invention relates to a fastening arrangement for axially securing machine elements and has particular application to installing rolling bearings without clearance or preloaded on a shaft or the like and a method for assembly thereof.

A known process for producing such an arrangement is illustrated in German preliminary application No. 2,204,831. In accordance with the teachings of this prior invention, the preloading is applied exclusively to the machine element to be fastened by means of a radially acting tool which in addition to applying the deformation forces also must apply the preloading forces to the machine element. Accurate preloading force is necessary, for example, in rolling bearing applications which are installed without clearance or preloaded and in accordance with this prior teaching this accuracy cannot easily be obtained. Furthermore, the geometric configuration of the fastening ring is such to produce large area pressure on the relatively small contact surface which in some instances results in plastic deformation at these interengaging locations and with the result that the preloading is destroyed. For example, the machine element is in the form of a conically deformed ring which rests with a conically-shaped front face against the rounded edge of the roller bearing. Thus, with high axial preloading forces and/or with high operational axial forces, the area pressure on the relatively small contact surface has been found to be excessive and as noted above results in diminution or elimination of the preloading. The ring-like machine element is then no longer sufficiently secured or mounted in the precisely provided location to achieve the preloading and without clearance mounting of the bearing. In some instances this may lead to operational interruptions and premature failure of the bearing. Finally, these prior machine elements are thin-walled bushing-shaped rings that tend to bend as a result of the forces applied during operation and the mounting or fastening, therefore, tends to loosen. The ring may also loosen under high RPM's and resulting high centrifugal forces.

With the foregoing in mind, it is an object of the present invention to provide an arrangement for axially fastening or securing machine elements which makes it possible on the one hand to apply an accurately determined preloading to the machine element to be fastened such as the inner rings of a bearing assembly and on the other hand supports the machine element over a relatively large surface area additionally securing and accurately fastening the machine element even under the highest loads. To this end, there is provided a closed bushing-shaped ring of angular or L-shaped cross section which is adapted to be conically deformed by plastic deformation at one end thereof remote from the machine element to be fastened in such a way that the corresponding front face thereof enters in an annular groove in a shaft member or the like away from the machine element. Specifically the ring is constructed as an angular ring of L-shaped cross section wherein the radially outwardly directed leg abuts against the front fact of the machine component to be fastened and the axially extending leg portion is pressed in an annular groove in the shaft or the like at least at several circumferentially spaced locations about its periphery. By reason of the angular configuration of the ring including the radially outwardly directed leg portion, it is possible during the mounting process to apply a preload force to the machine element such as the inner rings of a double row ball bearing assembly independently of the deformation force when the preload force is applied to this leg by means of a suitable deforming tool. On the other hand, the axial end face of the radial leg portion confronting the machine element provides a large contact zone between the two and in addition stiffens or strengthens the ring and prevents in this fashion bending under high loads and consequent loosening thereof.

In order to further rigidify the mounting of the ring and prevent loosening thereof, the bore of the angular ring may be made of slightly smaller diameter than the outer diameter of the shaft on which it is mounted to produce an additional press fit.

In accordance with another feature of the present invention, the fastening arrangement additionally includes a second annular member which engages over the axial leg portion of the angular ring with a press fit. This second ring may include internal threads which cooperate and engage with threads on the shaft member located adjacent the annular groove on the shaft member or the like. When the angular ring is press fitted this arrangement contributes to maintaining the angular ring in an accurate position and at least part of the axial forces are transmitted or absorbed by the press fit. The second ring engaging over the axial leg portion may be installed by a shrink fit or the like and it serves to prevent the deformed end of the angular ring from breaking up under load and consequent loosening which is harmful to maintaining the desired preloading of the assembly.

DESCRIPTION OF THE DRAWINGS

These and other objects of the present invention and the various features and details of the operation and construction thereof are hereinafter more fully set forth with reference to the accompanying drawings, wherein:

FIG. 1 is a partial longitudinal sectional view through a bearing for a hub unit for motor vehicles and the like.

DESCRIPTION OF THE PREFERRED EMBODIMENTS

Figure 1:
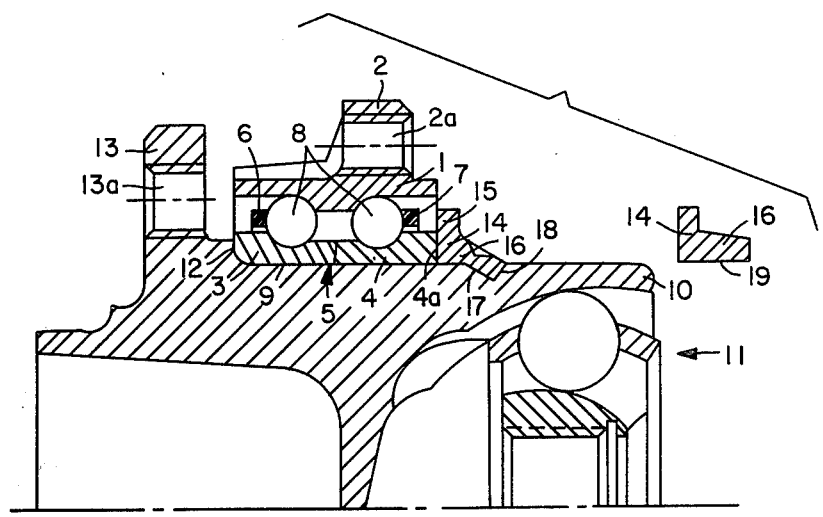

Referring now to the drawing and particularly to FIG. 1 thereof, the machine element fastening means of the present invention is illustrated in a wheel bearing assembly. These assemblies typically comprise an outer ring 1 having a radially outwardly directed flange 2 with bolt openings 2a for securing the bearing to the frame of the vehicle, an inner ring 5, consisting in the present instance of two annular inner ring members 3 and 4. The inner and outer rings have confronting spaced raceways for a plurality of rolling elements, balls 8 arranged in two rows. The balls in each row are circumferentially spaced by conventional cages 6 and 7. The inner rings are mounted on the outer peripheral surface of a body member 10 of a homokinetic joint 11, the inner ring 3 abutting at one axial end a shoulder 12 formed in the outer body portion 10 which also has a radial flange 13 with bolt holes 13a for mounting a wheel rim (not shown).

In accordance with the present invention, means are provided for preloading the rolling elements in a manner firmly securing the inner ring members against the shoulder 12. To this end, there is provided an angular ring 14 having a radially outwardly directed circumferentially extending leg portion 15 which abuts the axial outer end face 4a of the inner ring component 4. The angular ring 14 made of a deformable metal such as deep-drawing steel also includes an axially extending leg portion 16 adapted to be deformed inwardly in such a manner that it engages in an annular groove 17 in the outer peripheral surface of the body portion 10. The annular groove 17 as illustrated is of generally triangular cross section so that the leg portion 16 is supported in an axial direction on the flank 18 of the annular groove 17. Note that initially the angular ring 14 is shown on the right-hand side of FIG. 1 prior to assembly and after it is positioned over the body member, it is deformed into the annular groove 17 at a plurality of circumferentially-spaced locations by a radially or essentially radially acting tool. For enduring deformation of the axial leg portion 16, an axial force is applied to the radial leg portion 15 which preloads the two inner ring components 3 and 4 and, therefore, preloads the rolling elements or balls of each row with respect to each other.

If desired, the bore 19 of the angular ring 14 may be of a smaller diameter than the diameter of the outer surface 9 of the body portion 10. In this instance, the angular ring may be heated prior to installation to expand it slightly and permit easy assembly to the body portion and after cooling, the angular ring shrinks to provide an additional press fit with the body portion which increases the holding action of the angular ring 14.

Figure 2:
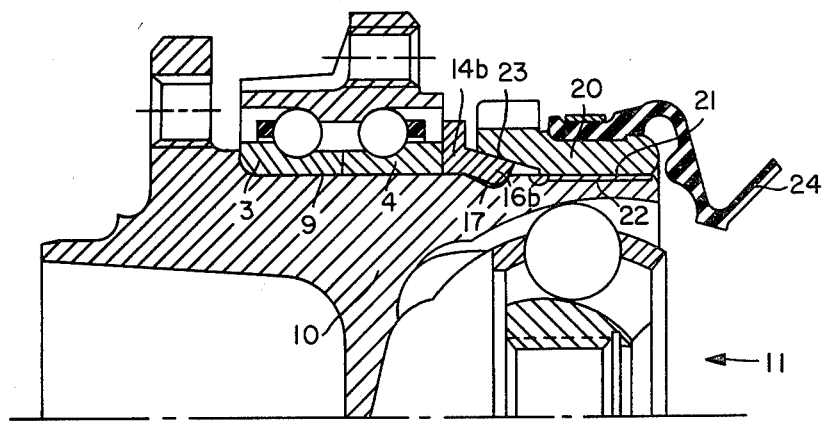
FIG. 2 is a view similar to FIG. 1 of a modified mounting arrangement.

There is illustrated in FIG. 2 a modified version of the fastening means in accordance with the present invention. The hub unit assembly with which the fastening means is utilized is essentially the same as that described previously and accordingly carries the same reference numerals. In accordance with this embodiment, the fastening means includes the angular ring 14b, and in this instance the axial leg portion 16b thereof is deformed into the angular groove 17 over its entire periphery and thereafter an additional second fastening ring 20 is mounted over the deformed leg portion 16b of the angular ring 14b. In the present instance the ring has internal threads 21 which cooperate with a threaded projection 22 on the outer peripheral surface 9 of the body portion 10. The second ring 20 has a conical internal face which confronts and engages the conical outer face of the leg portion 16b to thereby secure it against a reverse deformation or spring back and thereby guarantee a firm mounting arrangement which can withstand heavy loading even under severe operating conditions such as high RPM's and resultant high centrifugal forces which would tend to loosen the angular ring 14b during operation. The secondary ring 20 also serves to fasten a bellow 24 for sealing the homokinetic joint assembly 11.

Even though particular embodiments of the invention have been illustrated and described herein, it is not intended to limit the invention and changes and modifications may be made therein within the scope of the following claims.

What is claimed is:

1. Means for securing a machine element such as a bearing assembly on a shaft member or the like having an annular groove (17) comprising an angular ring (14) having a radially outwardly directed leg portion (15) which abuts against an axial end face of the inner ring component to be secured, and an axial leg portion (16) which is pressed into said annular groove (17) at least at a plurality of circumferentially spaced locations about its periphery and a second ring member mounted on the shaft member and having a portion which overlies and engages the axial leg portion of said angular ring (14).

2. A fastening means as claimed in claim 1 wherein said second ring member has internal threads which cooperate with threads on the periphery of the shaft to facilitate mounting.

3. A fastening means as claimed in claim 1 wherein said second ring member is provided with a conical inner face which overlies and complements a tapered outer face of the axial leg portion of said angular ring (14).

4. In combination a bearing assembly comprising a pair of inner rings (3, 4) mounted side by side on a shaft member having an annular groove (17), an outer ring (1) and a plurality of rolling elements (8) arranged in two rows in the annular space between the inner and outer rings, an angular ring (14) having a radially outwardly directed leg portion (15) which abuts against an axial end face of one of the inner rings and an axial leg portion (16) which is pressed into the annular groove (17) of the shaft at least at a plurality of circumferentially spaced locations about its periphery to preload the rolling elements, said angular ring having a bore (19) with a smaller diameter than the outer diameter of the shaft on which it is mounted to produce an additional press fit between the angular ring and shaft.

5. The combination as claimed in claim 4 wherein said radially directed leg portion (15) extends radially outwardly beyond the outer peripheral surface of said inner ring completely overlies the axial end face of said inner ring thereby to provide a large contact area therebetween and thereby stiffen said ring and prevent bending under high loads and consequent loosening thereof.

6. The combination as claimed in claim 4 wherein said inner rings are preloaded additionally by application of an axial force to said radial leg portion.

* * * * *